Figure 1:
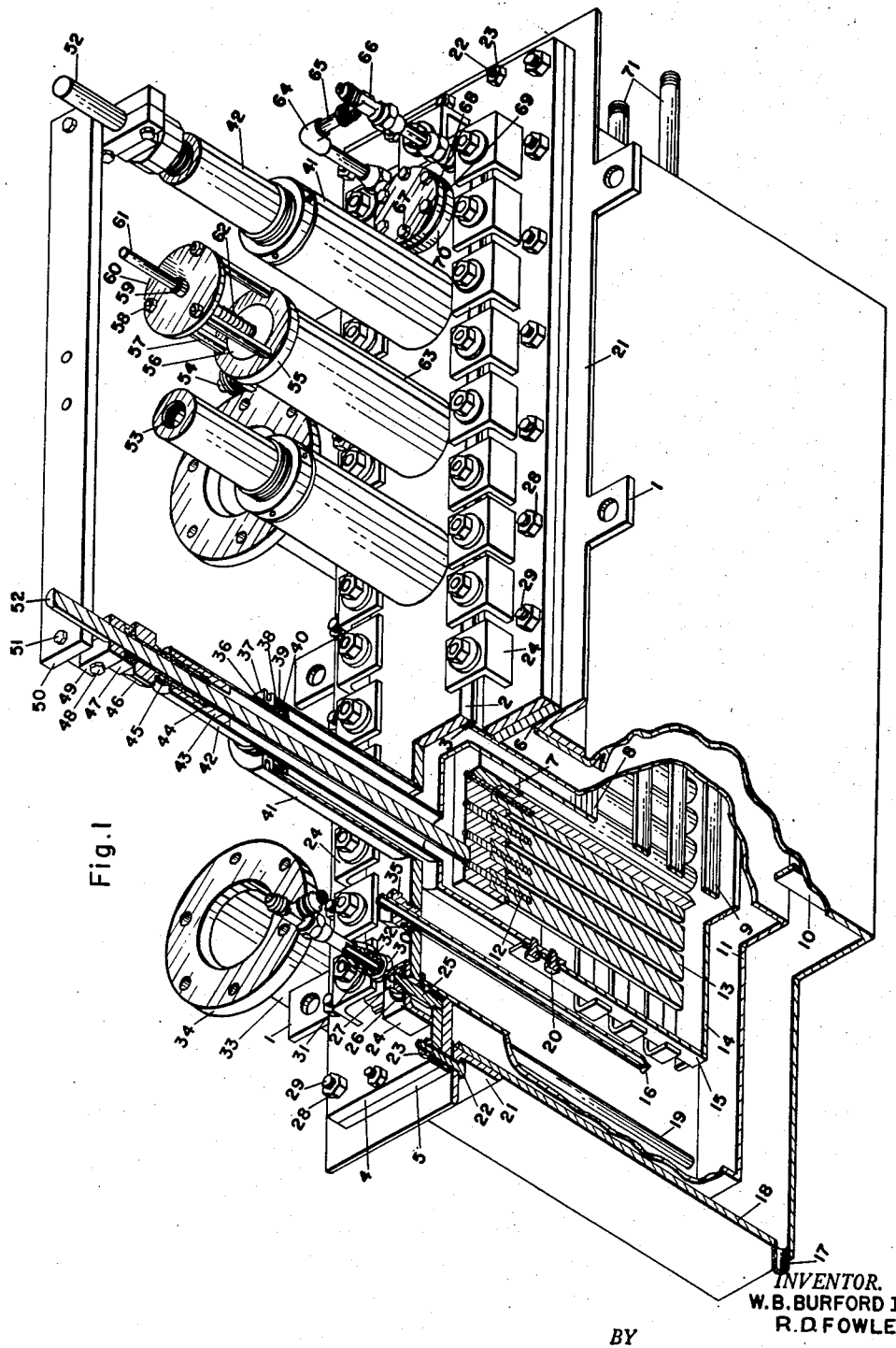

Sept. 8, 1953 R. D. FOWLER ET AL 2,651,613
FLUORINE CELL
Filed Feb. 21, 1947 3 Sheets-Sheet 1

INVENTOR.
W. B. BURFORD III
R. D. FOWLER
BY
Robert A. Lavender

Sept. 8, 1953　　　R. D. FOWLER ET AL　　　2,651,613
FLUORINE CELL
Filed Feb. 21, 1947　　　　　　　　　　　　　　3 Sheets-Sheet 2

INVENTOR.
W. B. BURFORD III
R. D. FOWLER
BY

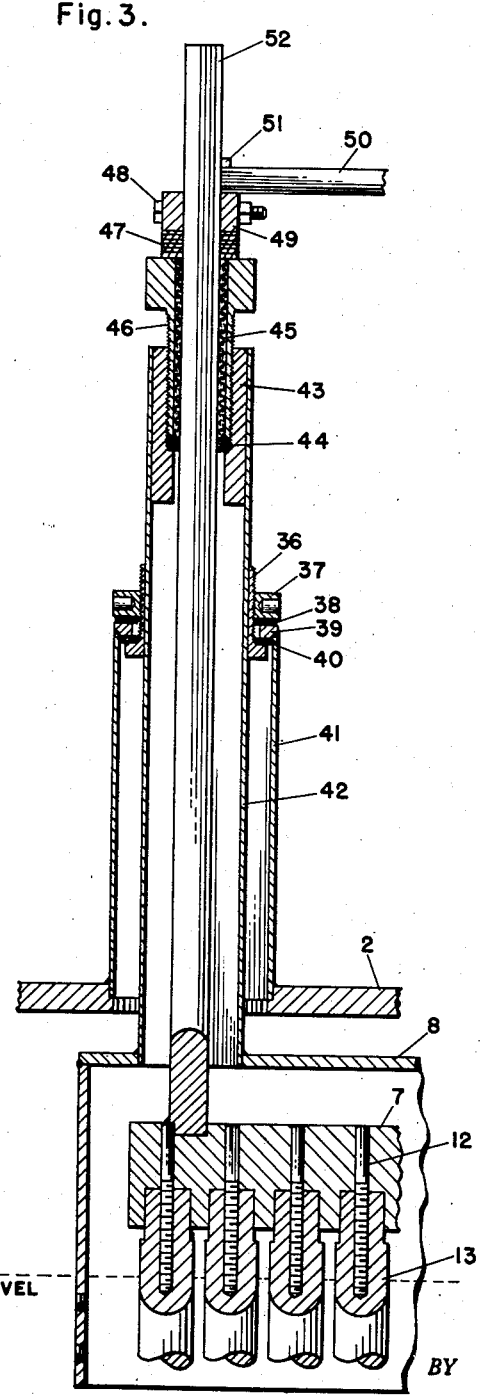

Patented Sept. 8, 1953

2,651,613

UNITED STATES PATENT OFFICE 2,651,613

FLUORINE CELL

Robert D. Fowler and William B. Burford III, Baltimore, Md., assignors to the United States of America as represented by the United States Atomic Energy Commission Application February 21, 1947, Serial No. 730,100

5 Claims. (Cl. 204—247)

1

This invention relates to an electrolytic unit for the manufacture of fluorine and more particularly to a high temperature carbon anode cell for producing fluorine by the electrolysis of fused alkali metal hydrogen fluorides.

Previous electrolytic cells used for the production of fluorine have suffered from various defects. In many cells corrosion of vital parts of the cell proceeds much too rapidly. Many cells polarize readily thereby interfering with the production of fluorine. In some cells losses of hydrogen fluoride are so high that the production of fluorine becomes uneconomical. Many cells are extremely sensitive to changes in the hydrogen fluoride concentration in the electrolyte or to changes in the temperature of the electrolyte. Formation of electrolyte deposits in the upper parts of the cell is a source of trouble in many cells. These difficulties are overcome by the present invention.

It is an object of this invention to provide an electrolytic unit for the production of fluorine from alkali metal hydrogen fluorides, which is safe, flexible and moderate in cost. A further object is to provide an electrolytic cell which is adapted to produce fluorine without difficulty from an electrolyte of an alkali metal hydrogen fluoride over a relatively wide range of electrolyte temperature. A still further object is to provide an electrolytic unit for the production of fluorine which is compact and extremely economical in the consumption of hydrogen fluoride. Another object is to provide a fluorine cell which can be operated at high current densities. Another object is to provide a fluorine cell, the operation of which is relatively insensitive to temperature variations, voltage changes and fluctuations in the supply of hydrogen fluoride. Another object is to provide a fluorine cell which is not readily polarized even at its unusually high operating current density. Another object is to provide a fluorine cell in which electrolyte deposits above the level of the electrolyte bath are not readily formed. Other objects will appear hereinafter.

These objects are accomplished in accordance with the present invention which pertains to an electrolytic unit for the manufacture of fluorine from alkali metal hydrogen fluorides which comprises a box-shaped cathode for containing the electrolyte, a carbon anode dipping into the electrolyte contained in said cathode, electrical connections from a source of direct current electricity to said cathode and said anode, a barrier for preventing any broken piece of said anode from setting up a short circuit within the cell, a skirt dipping into said electrolyte to separate the fluorine liberated at the anode from the hydrogen liberated at the cathode, separate outlets for the fluorine and hydrogen which have been liberated, cooling means for liquefying and separating hydrogen fluoride from the liberated fluorine and hydrogen by which it has been entrained, means for vaporizing the hydrogen fluoride which has thus been liquefied and separated, and means for returning this vaporized hydrogen fluoride to the electrolyte.

Figure 2:
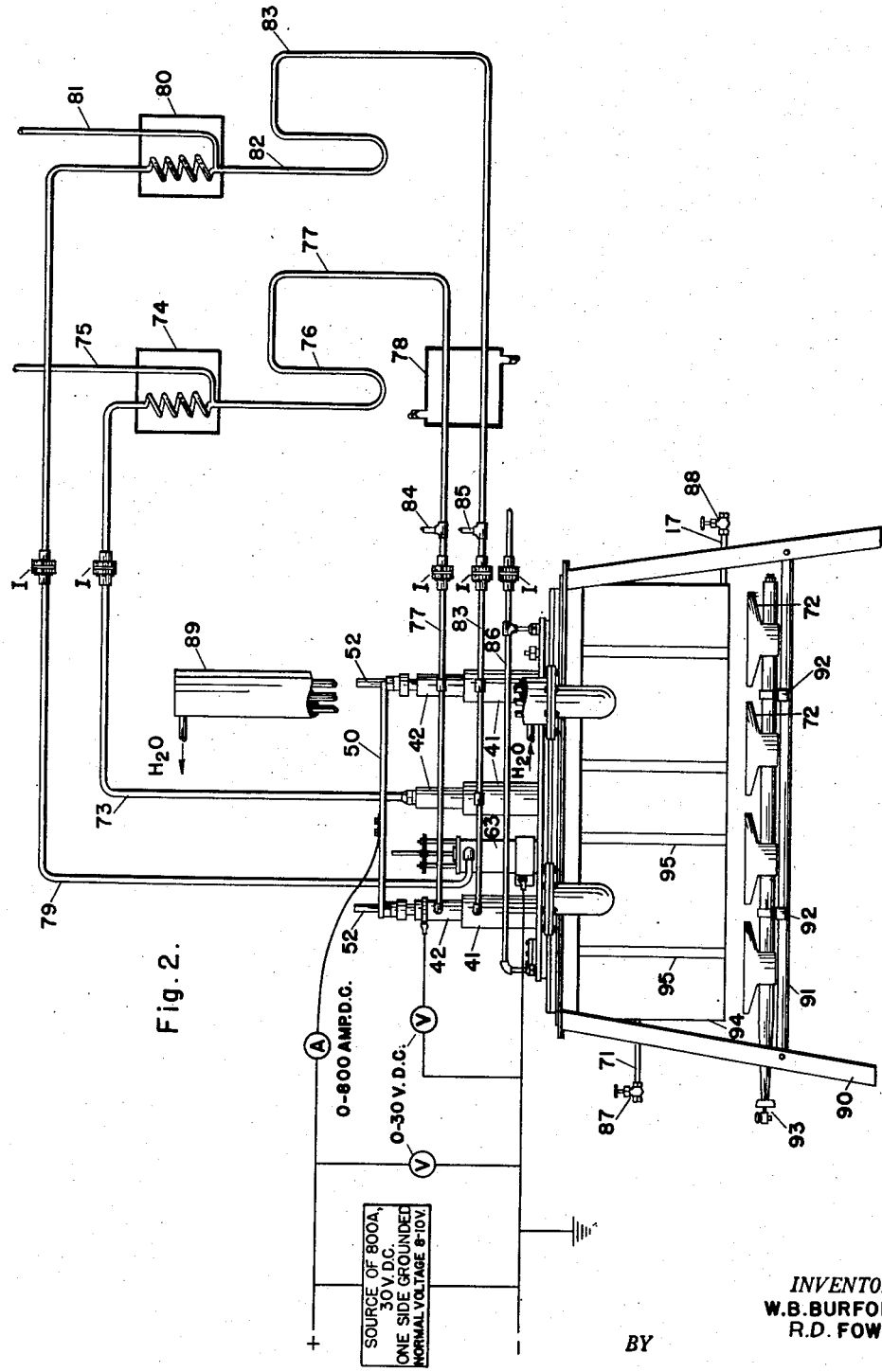

Applicants' invention will be more readily understood by referring to the accompanying drawings wherein Figure 1 is a perspective view of a fluorine cell with one corner cut away to show the internal arrangement of the cell parts, Figure 2 is an elevation showing the complete unit with electrical and fluid connections to the cell, and Figure 3 is a sectional view showing the details of supports for the anode assembly and skirt assembly.

Before giving a detailed description of the invention the principal features thereof will be summarized with reference to the drawings. The cathode 11 is in the shape of a box and serves as a container for the electrolyte. Around the cathode box 11 is a larger box 18 which contains a suitable liquid adapted to control the temperature of the electrolyte in the cathode box. Gas burners 72 are used to heat the liquid in box 18 to any desired temperature. A carbon anode comprising a plurality of carbon rods 13 dips into the electrolyte contained in the cathode box. The carbon rods 13 are fastened in an anode bar 7 which is suspended from two anode bar risers 52. These anode bar risers are connected to an anode bus bar 50 which is in turn connected to a suitable source of electric current. The anode is surrounded by a skirt 8 which dips into the electrolyte and serves to separate the fluorine liberated at the anode from the hydrogen liberated at the cathode. From the skirt 8 there is suspended a barrier which prevents any broken piece of carbon from the anode from setting up a short circuit within the cell. This barrier consists of diaphragm cage ends 15, diaphragm cage bottom 14 and six diaphragm cage bars 9. The fluorine liberated at the anode is taken off through gas outlet fitting 53 and line 73 to condensing unit 74 wherein entrained hydrogen fluoride is liquefied. Fluorine freed from entrained hydrogen fluoride passes out of the top of condensing coil 75. Liquid hydrogen fluoride passes to U-tube 76 which acts as a liquid seal. From the U-tube 76 the liquid hydrogen fluoride passes into line 77 which goes through heater 78 which serves to vaporize the hydrogen fluoride, and from there line 77 conveys hydrogen fluoride vapors back to the anode chamber of the cell. Hydrogen liberated at the cathode leaves the cell through outlet 54 and goes through line 79 to condensing unit 80 wherein entrained hydrogen fluoride is liquefied. Hydrogen freed from entrained hydrogen fluoride passes out of the top of condensing coil 81. Liquid hydrogen fluoride passes to U-tube 82 which acts as a liquid seal. From the U-tube 82 the liquid hydrogen fluoride passes into line 83 which goes through heater 78 which serves to vaporize the hydrogen fluoride, and from there line 83 conveys hydrogen fluoride vapors back to the cathode side of skirt 8. T's 84 and 85 in lines 77 and 83, respectively, enable hydrogen fluoride from a separate source (not shown) to be introduced into these lines. Line 86 connects with the four regeneration tubes 19 at each corner of the cathode box and serves to transmit hydrogen fluoride to the electrolyte to replace hydrogen fluoride that has been used up by electrolysis.

A detailed description of this electrolytic unit, the functions of the various parts thereof, and its mode of operation will now be given.

The steel coolant box 18 holds a suitable liquid for controlling the temperature of the electrolyte contained in cathode box 11. This box 18 is provided with fill and overflow pipes 71 to which are attached valves 87. An iron drain pipe 17 provided with suitable valve 88 is situated at the lower end of box 18. The upper side of box 18 connects with elbows 33 having flanges 34 for supporting the lower ends of tubular condensers 89 which serve for refluxing the temperature controlling liquid contained in box 18. As shown in Figure 2, it is feasible to use only one condenser and to bolt a suitable coverplate on the other flange 34. Short sections of rubber tubing are used in the water lines near condenser 89 to electrically isolate it from the water supply and drain pipes. Inside the coolant box 18 a number of vertical ribs 10 are welded thereto at spaced intervals. To the outer upper edge of coolant box 18 is welded flange 21 which is provided with six lugs 1 by which it is suspended from an appropriate supporting frame 90. On said frame 90 is a lower shelf 91 which carries electrically insulated mounts 92 for burners 72. The gas supply for these burners 72 is controlled by valve 93. The coolant box 18 is insulated on its sides and ends only with sheet magnesia 94 supported by steel straps 95.

Since the electrolyte employed melts at about 240° C., it is advisable to use a thermostat liquid in box 18 which boils at a temperature higher than 240° C. Diphenyl oxide is a suitable thermostat liquid since it boils at 259° C., which is above the melting point of the electrolyte and at the lower end of the operating range of the cell. During periods when the cell is not in operation heat is supplied by gas burners 72 to maintain the electrolyte in a liquid condition. During operation, however, the cell does not require auxiliary heat, and the liquid serves to keep the temperature of the electrolyte within the desired range. Diphenyl oxide vapor is condensed in water-cooled condenser 89 and returned to coolant box 18. The thermostat liquid serves to prevent local overheating in the electrolyte bath and corrosion of the electrolyte container.

The electrolyte container and cell cathode 11 is a narrow Monel box provided with a Monel flange 5 near the top thereof. At spaced intervals on the sides and ends of this flange are holes for bolts 22 and 29. All seams on this cathode box are electrically welded and free from gas leaks. The flange 5 of the cathode box rests on flange 21 of the coolant box below thereby sealing the diphenyl oxide compartment with the aid of lead gasket 6. A rectangular steel clamp flange 4 also provided with holes for bolts 22 and 29 rests on Monel flange 5. Threaded holes in this clamp flange 4 receive the lower threaded ends of clamp studs 25. Clamp nuts 27 and washers 26 on the upper threaded ends of clamp studs 25 serve to hold down the L-shaped head plate clamps 24 which maintain the copper head plate 2 in position. Bolts 22 and nuts 23 bind coolant box flange 21, cathode box flange 5 and clamp flange 4 together at the ends while bolts 29 and nuts 28 hold these box flanges 21 and 5 and the clamp flange 4 together at the sides of the cell.

All parts of the cell above and within the electrolyte box 11 are, when assembled, attached to a single plate of copper called the head plate 2. This head plate rests on the machined top edge of Monel box 11. It is held securely in place by head plate clamps 24 and this joint is made gas tight by the copper sheathed asbestos head plate gasket 3. This head plate 2 carries the anode, skirt, diaphragm cage and all auxiliary equipment in one integral unit. It can be lifted out of the electrolyte container in one piece and normally is the only part of the cell to require maintenance or repair work.

Symmetrically arranged on head plate 2 are three copper cathode tubes 41 from which the skirt, diaphragm cage and anode assembly are suspended. Diahpragm clamp rings 36, lock rings 37 and cathode riser rings 39 cooperate to support anode tubes 42 within the cathode tubes 41. The packings 38 and 40 are made from tetrafluoroethylene polymer and serve to prevent gas from escaping from the space between tubes 41 and 42 and also to electrically insulate the cathode from the skirt assembly. The details of these features are best shown in Figure 3 of the drawing. Cathode tubes 41 are made sufficiently high so that the packings 38 and 40 are not located in the high temperature zone near head plate 2. This increases the life of these packings. In addition, as will be more fully described hereinafter, the annular space between the cathode tube 41 and the anode tube 42 is continuously swept with anhydrous hydrogen fluoride to provide a protective blanket below the packing and insulation.

Copper head plate 2 is also provided with an inspection port surrounded by ring 70. The port cover 68 and port gasket 69 of tetrafluoroethylene polymer are held down against the ring by bolts 67 to securely seal this inspection port during operation of the cell. If desired, a mechanical motor driven stirrer may be installed in this inspection port. Such a stirrer makes it possible to operate longer without polarization. The stirrer facilitates temperature control and makes it possible to maintain a higher current density.

Head plate 2 is also provided with a thermocouple well 16 held in place by nut 35.

The unsymmetrically located fourth tube on head plate 2, known as gas outlet tube 63, is provided with an outlet 54 for the hydrogen and entrained hydrogen fluoride which comes from the cathode. This outlet 54 is connected with line 79 which carries hydrogen from the cell to condenser 80 wherein entrained hydrogen fluoride is removed therefrom. Located at the top of outlet tube 63 is a pressure release valve. The plunger 56 of this valve seats in seat plate 55 and carries a stem 61. This stem 61 operates in bushing 59 carried by guide plate 60. Guide plate 60 is held in spaced relation to tube 63 by spacers 57 and nuts 58. Spring 62 which surrounds stem 61 bears against guide plate 60 and plunger 56 and causes the plunger to normally remain seated. The plunger on this pressure release valve rises in the event of an explosion in the cell or line stoppage to release the pressure.

Four Monel tubes 19, one at each corner of head plate 2, convey the hydrogen fluoride supplied through line 86 to the electrolyte. This hydrogen fluoride is supplied at a gauge pressure of from 5 to 10 pounds and serves to replace hydrogen fluoride which has been used up by electrolysis. Line 86 is provided with a vent to prevent electrolyte from sucking back. T's 66, nipples 65 and elbows 64 function as connections between line 86 and tubes 19. Packing glands 30, packing nuts 31 and shredded packing 32 of tetrafluoroethylene polymer seal the holes in head plate 2 through which tubes 19 protrude.

Anode tubes 42 are connected at their lower ends with openings in the top side of Monel skirt 8. This skirt 8 projects below the surface of the electrolyte and serves to divide the anode gas compartment from the cathode gas space. Monel bolts 20 serve to attach the diaphragm cage ends 15 to the lower edge of skirt 8. The diaphragm cage bottom 14 and diaphragm cage bars 9 are in turn welded to the cage ends 15. The cage assembly formed by elements 9, 14 and 15 is provided to confine any broken anodes and thereby to prevent them from causing a short circuit between the anode and cathode. Bottom plate 14 is the same width as the skirt and serves to prevent any hydrogen liberated at the bottom of the cathode box from rising into the fluorine compartment and reducing the cell efficiency. The fluorine generated at the anode rises inside of Monel skirt 8 and leaves the cell through tube 42 in the middle of the cell.

Anode tubes 42 are made of Monel tubing. The anode tube in the center of the cell carries a gas outlet fitting 53 which connects with pipe 73 and serves as an outlet for fluorine and entrained hydrogen fluoride. The anode tubes at the ends of the cell are provided with suitable supporting means for holding the anode bar risers in place. The supporting means for an anode bar riser is more clearly shown in Figure 3. Anode packing gland 43 is brazed to the interior of the top of anode tube 42. The upper portion of packing gland 43 is threaded to receive the anode packing nut 46. Packing 44 made from tetrafluoroethylene polymer is interposed between the lower edge of packing nut 46 and the ledge provided at the lower side of the threaded portion of packing gland 43. Mica insulation sleeve 45 lies between anode bar riser 52 and packing nut 46. Packing 44, mica sleeve 45 and the spacer block 47, which is made from phenol-formaldehyde resin, jointly serve to electrically insulate anode tube 42 from anode bar riser 52. The copper clamp block 49 which is fastened together by bolts 48 serves to hold the upper end of anode bar riser 52 so that the carbon anode rods 13 are suspended properly within the cell. The copper anode bus bar 50 is fastened by bolts 51 to the clamp blocks 49 associated with each of the anode bar risers 52. The anode bus bar is suitably connected with a source of direct current electricity.

The lower ends of the copper anode bar risers 52 are brazed to the copper anode bar 7 which in turn supports the carbon anode rods 13. These carbon anode rods 13 are drilled and tapped and fitted with copper dowel pins 12 which are threaded to engage the tapped portions of the carbon rods. The upper portions of these carbon rods are machined to a drive fit in the sockets in anode bar 7. The sockets in bar 7 are bored 0.003 inch smaller in diameter than the carbon rods. The carbon rods and copper dowel pins are driven into these sockets in bar 7, the dowel pins fitting into centrally located holes running from the sockets through the top of the anode bar 7. The upper ends of the dowel pins which project through the anode bar are silver soldered at the top to insure a durable electrical connection.

In Figure 2 the piping and electrical connections required for operation are shown. The anode connection is made directly to the flat copper bus bar between the anode bar risers, while the cathode connection may be placed at any convenient point. It is shown as a strap around the hydrogen outlet tube 63. Suitable ammeters, voltmeters and electrical controls are provided to measure and control the electric current being used in the cell.

The hard drawn copper tubes 73 and 79 which convey fluorine and hydrogen from the cell and the soft drawn copper tubes 77, 83 and 86 which bring hydrogen fluoride into the cell are all provided with flanged insulators I having tetrafluoroethylene polymer where the insulation is in contact with the gases and fiber bushings around the bolts. These insulators I shown in Figure 2 serve to insulate the cell from auxiliary apparatus.

Fluorine containing entrained hydrogen fluoride flows through line 73 to condensing unit 74 maintained at about −60° or −70° C. Entrained hydrogen fluoride is liquefied in the condensing unit while pure fluorine issues from the top of copper coil 75. The liquefied hydrogen fluoride flows down into U-tube 76, which acts as a liquid seal. From the U-tube 76 line 77 conveys the hydrogen fluoride through the steam or hot air heater 78, where it is vaporized, to connections with the sides of the two anode tubes 42 at each end of the cell. The hydrogen fluoride which is thus stripped from the fluorine enters the anode tubes 42 as shown in Figure 2 and forms a continuous sweep down the annular space surrounding the two anode bar risers 52. T 84 in line 77 is connected to an independent source of anhydrous hydrogen fluoride and permits a slow supplementary sweep to be continuously added.

Hydrogen containing entrained hydrogen fluoride flows through line 79 to condensing unit 80 maintained at about −60° or −70° C. Entrained hydrogen fluoride is liquefied in the condensing unit while pure hydrogen issues from the top of copper coil 81. The liquefied hydrogen fluoride flows down into U-tube 82, which acts as a liquid seal. From the U-tube 82 line 83 conveys the hydrogen fluoride through the steam or hot air heater 78, where it is vaporized, to connections with the sides of the three cathode tubes 41 as shown in Figure 2. The hydrogen fluoride which is thus stripped from the hydrogen enters the three cathode tubes and forms a continuous sweep down the annular space between the cathode and anode tubes below the cathode tube packing assemblies. T 85 in line 83 is connected to an independent source of anhydrous hydrogen fluoride and permits a slow supplementary sweep to be continuously added.

If desired, condensing units 74 and 80 may be cut out, and all hydrogen fluoride used for sweeping in the anode and cathode tubes be supplied from an independent source of hydrogen fluoride. However, an apparatus including these condensing units is more efficient since these condensers cut down the losses of hydrogen fluoride.

The hydrogen fluoride sweeps provided through lines 77 and 83 to the anode and cathode tubes are a very advantageous feature of the present invention. These sweeps in addition to supplying considerable hydrogen fluoride to the electrolyte during electrolysis and protecting the packing glands also tend to combine with and liquefy any electrolyte which splashes up and solidifies on the cooler parts of the head thereby greatly reducing short circuiting and sludge accumulation.

Monel metal is preferred for use in constructing the cathode box 11, skirt 8 and anode tubes 42, since when these parts are made from Monel metal they exhibit little tendency to corrode. The accumulation of sludge or insoluble metallic fluorides in the electrolyte is not a serious problem when all of the metal parts exposed to the electrolyte are made from Monel metal. It is preferred to construct the head plate 2 and parts above it from copper, which does not readily corrode and conducts electricity very well when so used.

If desired, the fluorine line may be connected to sensitive bellows-type pressure operated relays which are set to trip at from one to two ounces pressure. When tripped these relays close the circuit to a release coil on the circuit breaker in the electrolysis current circuit. Thus clogged lines or back pressure will cause electrolysis to cease.

If desired, flat carbon sheets may be used as anodes in place of carbon rods.

All valves used in the hydrogen fluoride and fluorine lines are ordinary all brass, globe-type water valves. The threads are lubricated with perfluoro oil or similar material to prevent sticking. Other types of valves may be used, but they are apt to be less satisfactory and hence are not to be preferred.

This electrolytic cell is easily disassembled since the entire head lifts out as a unit. By removing the Monel cage the anode bar assembly is readily dropped out. An anode bar assembly can easily be removed, replaced and reconnected by two men in about twenty minutes.

The cell described above normally uses a current of from 600 to 650 amperes, and the current density ranges from 300 to 325 amperes per square foot. The total voltage drop from anode to cathode is from 6 to 8 volts. The voltage drop from anode to skirt is from 4 to 5 volts, and the voltage drop from skirt to cathode is from 2 to 3 volts. There is little tendency for the skirt to function as a false cathode even though the voltage drop from cathode to skirt is relatively low. The normal electrolyte temperature ranges from 260° to 310° C. Current efficiencies are normally of the order of 90 to 95% when a cell is placed in operation. Current efficiency tends to drop as the cell is used.

It is preferred to regularly replace the hydrogen fluoride which is used up by electrolysis. From 2 to 3 pounds of anhydrous hydrogen fluoride are required after every 2000 ampere hours of operation. If hydrogen fluoride which is removed during fluorine production is not replaced, the temperature of the electrolyte and the voltage will go up resulting in decreased power efficiency.

The protective sweep of hydrogen fluoride going through lines 77 and 83 is important from the standpoint of regenerating the electrolyte. This hydrogen fluoride sweep, part of which is continuously supplied from cylinders of the gas, is absorbed by the electrolyte and thereby partially regenerates the same. The condensing systems thus serve as reservoirs of liquid hydrogen fluoride which is continuously vaporized and swept through the compartments above the electrolyte. As the electrolyte loses hydrogen fluoride due to electrolysis, the sweep gas from the reservoir dissolves in it providing part of the regeneration required. In addition, the condensing systems make it possible to temporarily store excesses of hydrogen fluoride without overloading the electrolyte.

It is not feasible to accomplish all of the necessary regeneration by adding hydrogen fluoride to the sweep lines 77 and 83 due to the relatively small area of exposed melt and the lack of stirring. Therefore, additional hydrogen fluoride is added by way of regeneration line 86 and tubes 19 to the bottom of the electrolyte. Whenever the amount of hydrogen fluoride added by way of line 86 is in excess of the requirement at the time of regeneration, a portion of the hydrogen fluoride vaporizes and is stored in the condensing systems. Whenever excessive amounts of hydrogen fluoride are added by way of line 86, it becomes unnecessary to add significant amounts of hydrogen fluoride to sweep lines 77 and 83 from an independent source by way of T's 84 and 85, since the normal regeneration procedure will replenish the supply in the condensing units. The addition of hydrogen fluoride to the bottom of the molten electrolyte stirs the same and equalizes the hydrogen fluoride concentration throughout the same.

Despite the wide temperature range in which operation is practical, it is desirable to keep the hydrogen fluoride concentration high enough to permit operation at 260–270° C., since at this temperature corrosion is slowest and conductivity of the electrolyte is highest resulting in less power loss as heat. It is also desirable to maintain liquid hydrogen fluoride in the condensing units to furnish an adequate sweep for the cell head. If this sweep becomes too slow, the splashing of electrolyte may result in a short circuit or a skin of solid electrolyte may form at the surface, trapping the gas below and resulting in explosions.

The electrolytic cells of the present invention do not readily become polarized. They display temporary polarization at times which may easily be abated by shutting off the current for a few seconds or by reversing the direction of the current for a short time. The preferred depolarization technique involves raising the applied voltage until normal current flow is re-established in spite of the polarized condition. This requires voltages as high as 30 volts. Depolarization is indicated by a sudden increase in the current going through the cell. The circuit is then broken, the voltage restored to normal, and the cell operates at the rated voltage when it is again connected.

The nature of the potassium hydrogen fluoride used as an electrolyte is such as to permit operation over a relatively wide temperature range without difficulty. Although this electrolyte normally melts at about 240° C. in equilibrium with an atmosphere containing hydrogen fluoride, the cell remains operable as hydrogen fluoride is removed by electrolysis or evaporation at temperatures as high as 320–340° C. If too much hydrogen fluoride is added to the electrolyte at a given temperature, the excess boils out as a gas. The electrolyte possesses the added advantage from a safety point of view of freezing very quickly if it escapes from the cell. Once solidified it can be handled with a minimum of danger.

The fluorine cells herein described have many advantages. Since they operate at a high current density, a large output of fluorine is obtained despite the small physical size of the cell. They can be successfully operated over a wide range of temperature and corresponding electrolyte composition. The value of these characteristics for experimental operations or intermittent duty can easily be appreciated. These cells have a low operational hazard. Escape of electrolyte from the cell seldom occurs even when there are explosions within the cathode box due to a stoppage in an outlet line. These units are extremely economical in the use of hydrogen fluoride, because the low temperature condensers 74 and 80 strip entrained hydrogen fluoride from the hydrogen and fluorine lines, and this hydrogen fluoride is then sent back to the cells. This results in effective use of almost all of the hydrogen fluoride fed to the cell. Corrosion of packing glands and caking of electrolyte on the upper parts of the cell is prevented by the sweep of hydrogen fluoride through the upper parts of the cell. Condensers 74 and 80 furnish much of the hydrogen fluoride needed for this sweep. These cells require but a minimum amount of maintenance work to keep them in shape. These cells do not readily become polarized, and when polarized they are easily depolarized by raising the applied voltage for a short time. These cells are relatively not affected by fluctuations in the hydrogen fluoride supply, applied voltage or temperature. If water is introduced accidentally into the electrolyte, it is possible to operate the cell satisfactorily until this water has been electrolyzed or distilled off. Many other advantages will be apparent from the description given hereinabove.

Resort may be had to such modifications and equivalents as fall within the spirit of the invention and the scope of the appended claims.

We claim:

1. An electrolytic unit for the manufacture of fluorine which comprises a box shaped cathode for containing the electrolyte, a carbon anode dipping into the electrolyte contained in said cathode, electrical connections for connecting a source of direct current electricity to said cathode and said anode, a barrier located beneath said anode and above the bottom of said cathode for catching and thereby preventing any broken piece of said anode from setting up a short circuit within the cell, a skirt located between said anode and said cathode, said skirt having an upper closed portion which provides a gas tight closure for the space surrounding and immediately above the upper part of said anode and having an open ended bottom dipping into said electrolyte to separate the fluorine liberated at the anode from the hydrogen liberated at the cathode, a fluorine outlet connected with the upper closed portion of said skirt, a head plate providing a gas tight closure covering said box shaped cathode, a hydrogen outlet connected with said head plate, condensers for liquefying and separating hydrogen fluoride from the liberated fluorine and hydrogen by which it has been entrained, a heater located in heat exchange relationship with the lines which convey the liquid hydrogen fluoride away from said condensers for vaporizing the hydrogen fluoride which has thus been liquefied and separated, inlets connected with the upper closed portion of said skirt and with said head plate, and return pipes for returning this vaporized hydrogen fluoride to the cell above the electrolyte thru said inlets.

2. An electrolytic unit for the manufacture of fluorine which comprises a box shaped cathode for containing the electrolyte, a larger box for containing a temperature controlling liquid surrounding said cathode, an anode consisting of a plurality of carbon rods dipping into the electrolyte contained in said cathode, electrical connections for connecting a source of direct current electricity to said cathode and said anode, a skirt located between said anode and said cathode, said skirt having an upper closed portion which provides a gas tight closure for the space surrounding and immediately above the upper part of said anode and having an open ended bottom dipping into said electrolyte to separate the fluorine liberated at the anode from the hydrogen liberated at the cathode, a cage assembly suspended from said skirt for catching and thereby preventing a broken piece of the anode from causing a short circuit within the cell, a fluorine outlet connected with the upper closed portion of said skirt, a head plate providing a gas tight closure covering said box shaped cathode, a hydrogen outlet connected with said head plate, condensers for stripping entrained hydrogen fluoride from the fluorine and hydrogen which have been liberated, inlets connected with the upper closed portion of said skirt and with said head plate, and return pipes running to said inlets for returning the hydrogen fluoride so stripped as a continuous gaseous sweep on all exposed metal surfaces within the cell lying above the electrolyte, and separate inlets for supplying hydrogen fluoride directly to the electrolyte to replenish hydrogen fluoride used up by electrolysis.

3. An electrolytic cell comprising a box shaped cathode for containing the electrolyte, a head plate for said cell, four tubes placed above holes in said head plate, smaller tubes concentrically arranged within three of these tubes and supported therein, said smaller tubes serving as a supporting means for a skirt which is located between the anode and the cathode and which separates the gases liberated at the anode from the gases liberated at the cathode and communicating with holes in the upper portion of said skirt, anode bar risers concentrically arranged within two of said smaller tubes and supported thereabove, an anode bar attached to the lower end of said anode bar risers and lying below the upper portion of said skirt, a plurality of carbon rods suspended from said anode bar, a cage assembly attached to the lower portion of said skirt for catching and thereby preventing any broken carbon rod from causing a short circuit between the anode and cathode, and suitable electrical connections for connecting a source of direct current electricity to said anode and said cathode.

4. An electrolytic cell comprising a box shaped cathode for containing the electrolyte, a head plate for said cell containing four holes therethrough, tubes placed above said holes, one of said tubes serving as an outlet for gas liberated at the cathode, smaller tubes concentrically arranged within the other three of the aforesaid tubes and supported therein, said smaller tubes serving to support at their lower ends a skirt which lies between the anode and the cathode and which separates the gases liberated at the anode from the gases liberated at the cathode and communicating with holes in the upper portion of said skirt, one of said smaller tubes serving as an outlet for gas liberated at the anode, anode bar risers concentrically arranged within the other two smaller tubes and supported thereabove, an anode bar attached to the lower end of said anode bar risers and lying below the upper portion of said skirt, a plurality of carbon rods attached to said anode bar, a cage assembly attached to the lower portion of said skirt for catching and thereby preventing any broken carbon rod from causing a short circuit between the anode and cathode, and suitable electrical connections for connecting a source of direct current electricity to said anode and said cathode.

5. An electrolytic unit for the manufacture of fluorine which comprises a box shaped cathode for containing the electrolyte, a carbon anode dipping into the electrolyte contained in said cathode, electrical connections for connecting said cathode and said anode to a source of direct current, a skirt located between said anode and said cathode which serves to separate the fluorine liberated at the anode from the hydrogen liberated at the cathode, said skirt having an open ended bottom dipping into said electrolyte and an upper closed portion which provides a gas tight closure for the space surrounding and immediately above the upper part of said anode, a fluorine outlet connected with the upper closed portion of said skirt, a head plate above said skirt providing a gas tight closure covering said box shaped cathode, a hydrogen outlet connected with said head plate, pipes for conducting fluorine and hydrogen away from said fluorine and hydrogen outlets, cooling means in heat exchange relationship with said pipes for condensing and thereby stripping entrained hydrogen fluoride from the fluorine and hydrogen streams passing through said pipes, heating means for vaporizing the hydrogen fluoride which has thus been stripped from said fluorine and hydrogen streams, inlets connected with the upper closed portion of said skirt and with said head plate, and return pipes running from said cooling means through said heating means and to said inlets for returning the hydrogen fluoride so stripped as a continuous gaseous sweep on all exposed metal surfaces within the cell lying above the electrolyte.

ROBERT D. FOWLER.
WILLIAM B. BURFORD III.

References Cited in the file of this patent

UNITED STATES PATENTS

| Number | Name | Date |
|---|---|---|
| 1,074,988 | Steinbuch | Oct. 7, 1913 |
| 1,096,085 | White | May 12, 1914 |
| 1,145,593 | Jewell | July 6, 1915 |
| 1,227,453 | Kipper | May 22, 1917 |
| 1,484,734 | Mathers | Feb. 26, 1924 |
| 1,819,917 | Niederreither et al. | Aug. 18, 1931 |
| 1,863,661 | Krekeler | June 21, 1932 |
| 2,186,917 | Gaylor | Jan. 9, 1940 |
| 2,193,323 | Nitzschke et al. | Mar. 12, 1940 |
| 2,363,386 | Bock | Nov. 21, 1944 |
| 2,428,584 | Richardson | Oct. 7, 1947 |
| 2,506,438 | Whitaker | May 2, 1950 |
| 2,540,248 | Downing | Feb. 6, 1951 |
| 2,568,844 | Benning et al. | Sept. 25, 1951 |

FOREIGN PATENTS

| Number | Country | Date |
|---|---|---|
| 549,354 | France | Nov. 17, 1922 |

OTHER REFERENCES

Chemical and Metallurgical Engineering, July 1946, pages 106 to 108.